May 9, 1967 J. E. RILEY ETAL 3,318,107
DEW COLLECTING METHOD AND APPARATUS
Filed Aug. 11, 1965 2 Sheets-Sheet 1
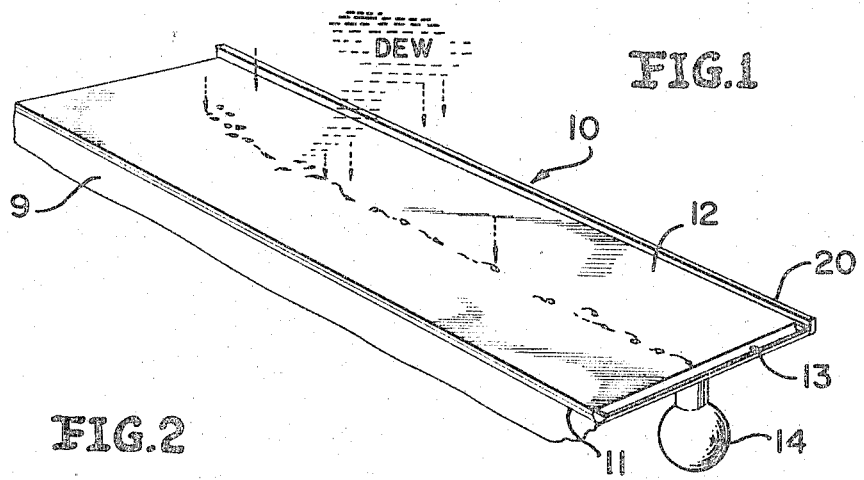
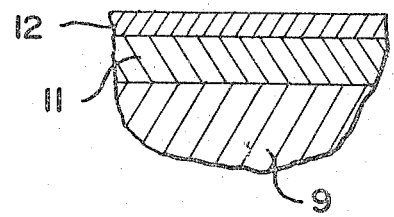
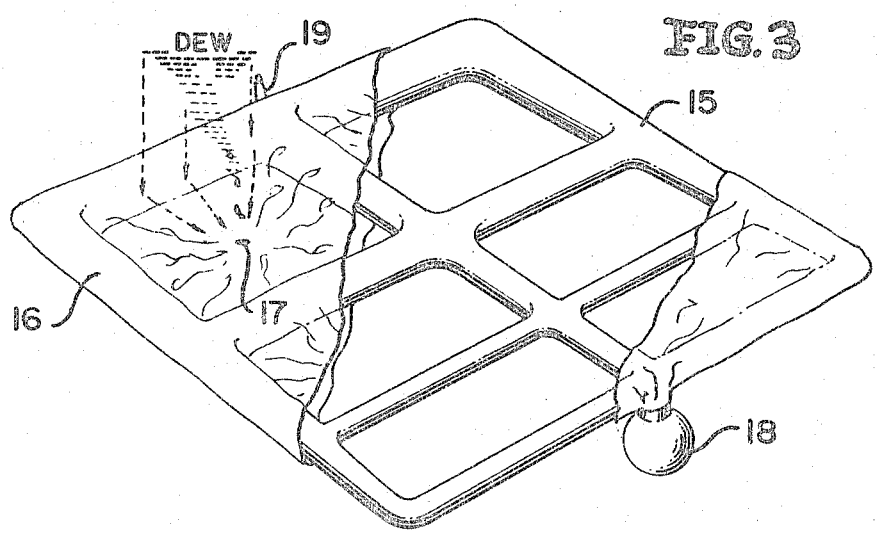
INVENTORS
JOHN E. RILEY &
ROBERT W. SMITH
BY *Hurvitz & Rose*
ATTORNEYS May 9, 1967 J. E. RILEY ETAL 3,318,107
DEW COLLECTING METHOD AND APPARATUS
Filed Aug. 11, 1965 2 Sheets-Sheet 2

INVENTORS
JOHN E. RILEY &
ROBERT W. SMITH

BY Hunity & Rose
ATTORNEYS

3,318,107
DEW COLLECTING METHOD AND APPARATUS

John E. Riley, Vienna, and Robert W. Smith, Oakton, Va., assignors to Melpar, Inc., Falls Church, Va., a corporation of Delaware
Filed Aug. 11, 1965, Ser. No. 478,897
6 Claims. (Cl. 62—272)

The present invention relates generally to methods of and apparatus for collecting water from the atmosphere and, more particularly, to water collection on a surface which is cooled by radiation to dew point temperature.

According to the present invention, water is collected, at night, from the surrounding atmosphere by causing the temperature of a collecting surface to be lowered to or below the dew point. The dew point is defined as that temperature at which water vapor condenses from the atmosphere, hence that temperature at which partial pressure of water vapor present in the atmosphere equals saturation pressure. Thus, at and below the dew point temperature, water can be extracted from the atmosphere without expending any mechanical energy.

It is known that dew may generally be collected in this manner and, in fact, is collected naturally by certain trees and shrubs. It is also known that structures called "dew ponds" have been built in locations having a high natural humidity to collect dew for general water consumption. These dew ponds were built by covering an area of ground with straw, then, a water-impervious layer made, for example, of clay, plaster, or stones was placed over the straw to form a catchment basin. During the night, as the layer cooled, the dew condensed upon it and trickled into a reservoir for later use. A number of persons have reported on water condensing structures that have been built in various parts of the world. Among these, are Descombes, who reported on the natural occurrence of dew formation on trees and shrubs in Communic. l'Acad. Sci., 1919, at pages 1106–1108; Hitier, who reported the existence of large limestone mounds for the purpose of collecting dew in Communic. l'Acad. d'Agric., 1925, at pages 679–683; and Mason, who reported several unsuccessful attempts to build dew condensing structures in Annales de l'Ecole Superieure des Sciences, Institut des Hautes Etudes de Dakar, vol. 1, 1954, at pages 1–44.

It is an object of the present invention to provide a lightweight and portable device for producing drinking water, based on the aforementioned general principle, but so designed and constructed, such that the amount of water produced will be sufficient in quantity to sustain a person for an indefinite time in an area lacking in natural water resources.

In accordance with this object, the factors which influence the occurrence of this phenomenon are developed and incorporated into a practical and portable device for producing a maximum amount of water from the atmosphere without the use of any mechanical energy or fuel.

In general, the sources of energy that are available and which must be controlled in order to achieve the objects of the present invention are (1) solar radiation during the daylight hours; (2) nocturnal radiation during the night; (3) atmospheric temperature changes, as between day and night; and (4) atmospheric water vapor concentration and humidity.

The atmospheric water vapor is the intended source of water which must be forced to change state, from vapor to liquid, on a suitable surface. In order for this change of state to take place, the surface temperature must be decreased to a temperature which is substantially equal to the dew point of the atmosphere directly above it. However, during the daylight hours the large amount of solar radiation that is present would generally be substantially absorbed by a material located in proximity to the ground, resulting in an increase in the temperature of the material and in the heat stored therein. Further, the absorption of heat by the ground during daylight hours would increase the heat storage thereof, and together with the stored heat of the aforementioned material, would necessarily prevent the required amount of temperature decrease from taking place.

In particular, it has been determined that in the southwest desert regions of the United States, for example, a maximum solar radiation of 3100 B.t.u./ft.$^2$/day occurs in summer and a minimum of 1200 B.t.u./ft.$^2$/day occurs during the winter. The daily maximum air temperature in certain regions can reach 130° F. at three feet above the ground, while the ground temperature may be even higher. During the night, the temperature may decrease to 40° F. or lower. Dew points during the summer may range from 60° to 80° F. near the oceans, to as low as 40° F. in certain desert regions.

The precipitation of dew requires that the dew point be reached near the surface on which the dew is to condense, although the relative humidity may be less at some distance away from the dew-condensing surface. It has been found that when the air temperature is 30° F. and the dew point is at the same temperature, the net nocturnal radiation loss from the surface will necessarily be 20 B.t.u./ft.$^2$/hour to precipitate the dew. At 50° F. the radiation loss must be 18 B.t.u./ft.$^2$/hour. With decreasing relative humidity, the radiation loss increases, reaching about 30 B.t.u./ft.$^2$/hour at 20% relative humidity in the 30° to 50° temperature range. Thus, the condensing surface must be capable of providing nocturnal radiation values of between 20 to 30 B.t.u./ft.$^2$/hour for operation under these conditions.

Various ambient factors affect the amount of dew that can be precipitated on a given condensing surface. Ambient factors which will cause an increase in the amount of dew precipitated are: (1) a clear night with an associated increase in nocturnal radiation; (2) a high humidity; (3) a low to moderate wind velocity; (4) vegetation generally covering the ground; and (5) a relatively low ground temperature.

Thus, the intense solar radiation occurring during the daylight hours must be substantially prevented from being absorbed by the condensing surface or by the ground therebeneath. Furthermore, during the night hours, when the temperature of the air decreases, the nocturnal radiation from the surface must be enhanced so that the surface temperature will decrease by the required amount, yet the absorption by the surface or stored energy in the ground must be minimized. It is essential, therefore, that the condensing surface have a high reflectivity and a low absorptivity for solar radiation incident on the surface during the daylight hours, while having a high emissivity for the nocturnal radiation. Since the wavelengths of the incident solar radiation are in the range of 0.4 to 2.0 microns and the wavelengths of the nocturnal radiation are in the range of 5 to 30 microns, a material, or combination of materials, is used that has reflectivity, absorptivity, and emissivity characteristics which will selectively provide minimum absorption and maximum reflection for radiation having wavelengths of 0.4 to 2.0 microns, while providing maximum radiation of wavelengths longer than 5 microns. In addition, a material is provided between the condensing surface and the surface of the ground having good thermal insulating characteristics for minimizing the flow of stored heat energy from the ground to the condensing surface, and the effect thereof on the temperature and nocturnal radiation of the surface.

If 90% of the incident solar energy can be reflected, then, even during the summer months only 10%, or about 300 B.t.u./ft.²/day, will be absorbed by the condensing surface. Most of this heat will be removed by natural convection, especially if the surface is backed with the aforementioned layer of heat insulating material which minimizes the heat flow from the ground. Furthermore, the high reflection, low absorption condensing surface in cooperation with the layer of heat insulating material, in accordance with the present invention, limits the heat flow into the ground beneath the device to less than 100 B.t.u./ft.²/day. This amount of heat may be conducted to the surface and removed by convection in about two hours during sunset. This, of course, minimizes the adverse nature of the ground heat storage effect on the amount of dew that is precipitated on the condensing surface during the optimum night hours of operation.

With these characteristics, the condensing surface is minimally heated during the day. The condensing layer temperature is quickly lowered at night to the dew point so that a saturated atmospheric condition is achieved immediately above the dew condenser, whereby water is deposited from the saturated atmosphere onto the condensing surface. The water is then collected by suitable means and can be used for survival purposes. The natural convection of air currents above the condensing surface continuously provides a layer of unsaturated air which is brought to saturation by the temperature of the condensing surface.

The invention is especially suited for extracting water from the atmosphere in desert climates, where daytime temperatures exceed 100° F. and relative humidities are on the order of 10%. On clear nights there is sometimes sufficient nocturnal radiation from the dew condenser to lower the temperature of the condenser and the air above it to 40° F. In response to this temperature reduction, relative humidity is increased greatly to cause saturated atmosphere conditions to be reached. The present invention enables temperature reductions to the dew point to be achieved even when the stated extreme variation is not attained. It is expected that with the present invention, dew point temperatures, and the accompanying deposition of water on the collecting surface, can be achieved in desert areas where the relative humidity at night is only 40%.

The apparatus of the present invention is particularly suited for use in emergency survival equipment. For this use the dew condenser must be simple to use, lightweight, reusable, and above all, able to collect an adequate amount of potable water for use by people in a remote area. The materials to be used must exhibit functional as well as non-toxic characteristics. The materials must also be relatively inexpensive, for economic reasons, and be very thin and lightweight so that a maximum surface area may be obtained at a minimum weight. The dew condenser must be readily foldable into a small package so that it may be conveniently carried by a person, for example, in a pack which would normally be carried on the back.

The dew condenser is adapted to be placed on smooth ground with a slight slope in relation thereto. A channel should be provided at the lower edge to collect the dew, which may be drained away into a container. The device is preferably in the form of a foldable blanket with reinforced edges, which are formed to enclose the condensing vapor and to hold the device to the ground.

It is, accordingly, an object of the present invention to provide a new and improved method of and apparatus for collecting water without expenditure of mechanical energy.

A further object of the present invention is to provide a new and improved method of and apparatus for collecting water from desert night air by lowering the air temperature immediately above a collecting surface to the dew point.

An additional object of the invention is to provide a new and improved method of and apparatus for collecting dew in arid climates by preventing substantial daytime heating of a water collecting area by utilizing a collecting surface having high reflectivity and low absorptivity characteristics with respect to the wavelengths of incident solar radiation, while having a high emissivity characteristic with respect to the relatively long wavelengths of nocturnal radiation.

Another object of the invention is to provide a new and improved desert survival article for collecting water from the atmosphere without the expenditure of mechanical energy, or fuel.

The above and still further objects, features and advantages of the present invention will become apparent upon consideration of the following detailed description of three specific embodiments thereof, especially when taken in conjunction with the accompanying drawings, wherein:

FIGURE 1 is a perspective view of an embodiment of the invention when it is adapted to be utilized as a desert survival article;

FIGURE 2 is an enlarged cross-sectional view of a portion of the device illustrated in FIGURE 1;

FIGURE 3 is a perspective view, with a portion of the cover cut away, showing a modification of FIGURE 1;

Figure 4:
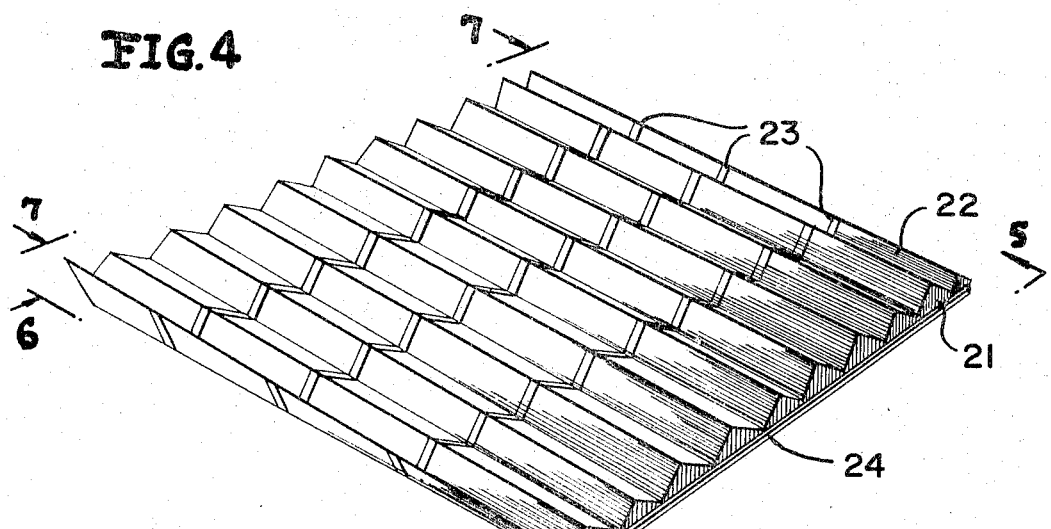
FIGURE 4 is a perspective view of another embodiment of the invention.
Figure 5:
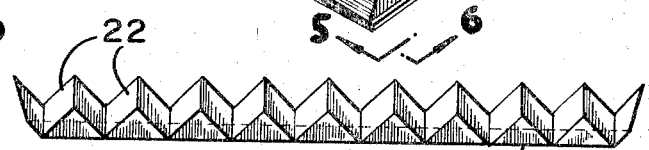
FIGURES 5–7 are views of the embodiment illustrated by FIGURE 4 taken through the lines 5—5, 6—6 and 7—7, respectively.
Figure 6:
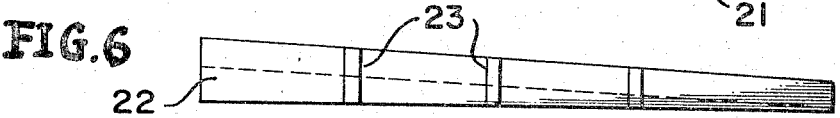
Figure 7:
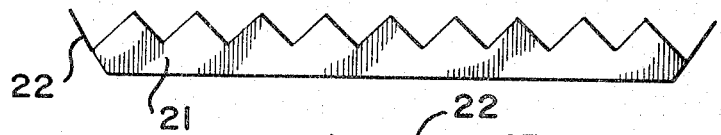

Referring now to the drawings, and more particularly to FIGURES 1 and 2 thereof, a dew blanket 10 is shown which comprises a flexible layer 12 on which dew is to be collected. A flexible layer 11 of heat insulating material may also be provided to insulate layer 12 from the ground or other supporting surface 9. Layers 11 and 12 may be laminated together by a suitable bonding process to form a unitary sheet.

Condensing layer 12 is fabricated from a material that has a high coefficient of sun reflectivity and an absorptivity of less than 0.1 to short wavelength radiation in the range 0.3 to 2.0 microns. Layer 12 must further readily emit nocturnal radiation by having an emissivity of at least 0.9 for radiation having long wavelengths in the range of 5 to 30 microns. Some of the best reflectors of solar radiation are non-tarnishing metals such as aluminum. Aluminum foil, however, must be protected against rain or dust if it is to be used continuously. White pigments, such as zinc oxide, magnesium oxide, titanium dioxide and others, also reflect highly and have sufficient reflectivity for the purposes of the present invention. Aluminum and some of the oxides, however, do not have the required high emissivity in the longer wavelengths and hence are not suitable when used alone. On the other hand, glass and several silicates do show the required high emissivity. A composite layer of aluminum foil covered with a glass powder or silicate paint, in a colorless binder, is appropriate for use as the condensing layer of the present invention.

At present, it appears that the most desirable materials for layer 12 are hydrophilic plastic films pigmented with the aforementioned white metal oxides. Examples of suitable plastic materials are polyvinyl fluoride film (Tedlar), fluorocarbon film (Teflon FEP), polyethylene film, polyester film (Mylar), and polyvinyl chloride film. Polyvinyl fluoride film pigmented with titanium dioxide is a preferred material because it has the required reflection and emission properties, as well as superb resistance to solar degradation. It also possesses characteristics of long life, strength, lightness, resistance to fatigue and facile flexibility. It can be flexed without failure, an important characteristic for a desert survival article that is normally folded into a pack and carried on the back.

Heat insulating layer 11 has the function of minimizing the amount of solar radiation entering the ground beneath the condensing layer during the day, and minimizing the nocturnal radiation from the ground at night. This enables the outer surface of condensing layer 12 to be brought and maintained at sufficiently low temperatures to reach the dew point. The material for layer 11 is preferably a flexible plastic foam having excellent heat insulation properties and characteristics of ease of fabrication, good mechanical strength, low weight density, and thermal conductivities in the range from 0.11 to 0.28 B.t.u./hr. ft.$^2$ ° F./inch. Examples of suitable materials are: polyvinyl chloride, silicon rubber and polyurethane. These materials may be expanded about 30 fold and can, therefore, be readily packed into a small volume. Polyurethane foams have the added feature of being non-allergic and non-toxic.

Another possible heat insulator is air. Since air has a conductivity of approximately 0.161 B.t.u./hr. ft.$^2$ ° F./in., it provides the desired heat insulating characteristics and has the advantage of not adding to the weight of the dew blanket.

As shown in FIGURE 1, the blanket 10 is provided with flexible reinforced retaining edges 20 which serve to confine the condensation to the surface 12. The edges 20 are provided on at least the two parallel edges, that run with the inclined surface, although such retaining means may be provided on the remaining edges if desired. (For the purpose of illustration, one retaining edge has been removed from the device of FIGURE 1.) The flexible strips which provide the retaining means may be bonded to the laminated sheets in any suitable manner. Alternatively, the condensation may be retained on the surface of the blanket 10 by providing raised portions on the edges of condensing surface 12 by bonding strips thereto. Also, the condensing surface 12 may be depressed in such a manner so as to cause the condensation to trickle away from the edges and toward the gutter 13.

Extending across one end of blanket 10 is a water collecting gutter 13, formed of a lightweight, collapsible, water impervious plastic material. Gutter 13 includes a drainage channel that slopes downwardly from each side of the blanket to its center where an aperture is provided. Precipitated water from the atmosphere flows through the aperture into a reservoir 14 where it is collected until it is utilized for drinking purposes. The gutter 13 will be an integral part of the condenser surface and is therefore composed of a material that can be readily affixed to blanket 10. The reservoir 14, on the other hand, should be firmly attached to the gutter 13 in such a way that it can be detached for the purpose of drinking the collected water. A suitable material for these units is plasticized polyvinyl chloride which exhibits excellent characteristics for heat sealing and folding and can be obtained in formulations that will pass the Food and Drug Administration's non-toxic requirements.

In use for desert survival, blanket 10 is removed from a pack, unrolled from its normal, carried position and the outer surface of layer 11 is placed on the ground, preferably sloping to the north in the northern hemisphere, so that the angle between the plane of condensing layer 12 and the sun is minimized. This aids in preventing excessive heating of condensing layer 12 during the day. Gutter 13 and reservoir 14 are then located at the lower edge of blanket 10. Heat that is stored in layer 11 during the day is quickly radiated as the sun sets because of the particular properties of surface 12. Thus, the atmospheric temperature directly above the blanket is reduced to the dew point and the water is precipitated on the top surface of the blanket 10. The precipitated water flows downwardly into channel 13 and reservoir 14 for storage purposes. A typical blanket having dimensions of 10 feet x 10 feet, when utilized in the desert, may be capable of collecting approximately 20 pounds or 2.5 gallons of water each night, a sufficient quantity to keep a man alive.

With the apparatus of FIGURE 1, less than 10% of the incident solar energy is absorbed by blanket 10 to increase its temperature. Some of the heat is removed by convection to the air and only a part is conducted to the ground. As previously indicated, it is, of course, desirable to prevent solar heat storage in the ground because this can be removed during the night only at the expense of nocturnal radiation. By using heat insulating layer 11, the accumulation of solar heat in the ground can be substantially decreased.

As the sun sets, the amount of solar energy, as well as the temperature of the ground and air, drop continuously. At this time, nocturnal radiation from layer 12 increases abruptly and the surface temperature of layer 12 decreases until the dew point is reached, whereupon dew begins to appear on the cold surface. During the night, the nocturnal radiation counterbalances the heat of condensation of the dew, which deposits as an increasingly thicker layer. By slightly sloping hydrophilic surface 12, the dew drains into gutter 13 and from there into reservoir 14.

To decrease the weight of the blanket so that it can be more easily carried, the heat insulation layer (in the embodiment of FIGURES 1 and 2) can be replaced with an air space, as shown by the article illustrated in FIGURE 3. This unit includes an inflatable rib structure 15 having a width that increases from one end to the other end of the blanket. Rib structure 15 is covered on all sides by a condensing layer 16, which can be made of any of the materials mentioned in conjunction with the embodiment shown in FIGURES 1 and 2. On the upper surface of layer 16, in each rectangular area between rib structure 15, a draining aperture 17 is provided. When rib structure 15 is inflated in response to air pressure applied thereto through valve 19, layer 16 has sufficient drape so that aperture 17 is at the lowest point between the ribs and the condensed water flows to it. The condensed water flowing through apertures 17 drains to the inside, lower surface of layer 16. It then flows downwardly beneath rib structure 15 to the end of the blanket where a canteen or reservoir 18 is located and is there collected.

A unit of this design meets all of the requirements for a water survival kit. For a blanket having a surface area of 100 square feet (10 feet x 10 feet), approximately 280 square feet of material is needed for construction. Available plastic film materials, such as those previously stated, have area factors as low as 20,000 square inches per pound per mil. Accordingly, a unit constructed of 2 mil thick material would weight only 4 pounds and would occupy approximately 20 cubic inches when loosely packed.

Reference is now made to FIGURES 4–8 wherein another foldable blanket is illustrated, having a greater condensation area by virtue of a corrugated construction. This blanket, when unfolded, comprises a flexible, foam insulating layer 21 of increasing thickness from the edge front to the rear edge and having elongated triangular corrugations extending therebetween. Bonded to the upper surface of layer 21 is a troughed condensing surface 22, divided into plural longitudinal sections which are separated by narrow plastic joints 23. The plastic joints 23 are formed from a material having a large coefficient of elasticity. At the front edge of the blanket, where the thickness of insulator 21 is minimum, a detachable collection trough 24 is located.

Figure 8:
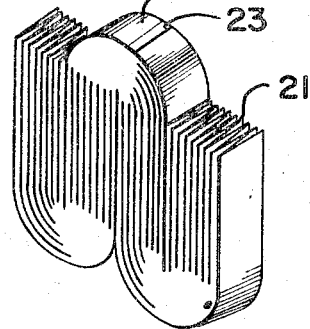
FIGURE 8 is a perspective view illustrating the manner whereby the blanket of FIGURE 4 can be folded.

When the embodiment of FIGURES 4–7 is not in use, trough 24 is removed, the blanket is collapsed accordian style, and then folded at elastic joints 23, as shown in FIGURE 8.

Other variations of the dew blanket are possible. One alternative embodiment is to make the dew collector in the form of a tent or other shelter wherein it would perform several functions. Other variations are possible within the scope of the invention.

While we have described and illustrated three specific embodiments of our invention, it will be clear that variations of the details of construction which are specifically illustrated and described may be resorted to without departing from the true spirit and scope of the invention as defined in the appended claims.

What is claimed is:

1. An article for collecting dew from the atmosphere comprising:

a sheet of material having a hydrophilic surface, said sheet having relatively low absorptivity of radiation in the range 0.3 to 2.0 microns and relatively high emissivity of radiation in the range of 5 to 30 microns;

means operatively associated with said sheet for thermally insulating said sheet from a supporting surface on which it is to be placed;

means operatively associated with said sheet for collecting the dew accumulated on said hydrophilic surface, and an inflatable rig structure for carrying said sheet;

wherein said means for thermally insulating comprises air adjacent said rib structure between said sheet and said supporting surface.

2. The article of claim 1 wherein said means for collecting the dew comprises:

a water impervious layer of material attached to the opposite side of said rib structure from said sheet;

a plurality of apertures in said sheet between said structure at points of minimum separation from said water impervious layer; and a reservoir connected to said water impervious layer.

3. An article for collecting dew from the atmosphere comprising:

a sheet of material having a hydrophilic surface, said sheet having relatively low absorptivity of radiation in the range 0.3 to 2.0 microns and relatively high emissivity of radiation in the range 5 to 30 microns;

means operatively associated with said sheet for thermally insulating said sheet from a supporting surface on which it is to be placed; and means operatively associated with said sheet for collecting the dew accumulated on said hydrophilic surface, wherein said sheet is corrugated to increase the area of said hydrophilic surface.

4. The article of claim 3 wherein said sheet comprises plural corrugated sections separated by narrow elastic joints whereby said sheet is readily folded into a small volume.

5. The article of claim 3 wherein said means for insulating comprises a flexible foam insulating layer having a rippled surface corresponding with the corrugation of said sheet.

6. The article of claim 5 wherein said insulating layer increases in thickness from one end to another so that said sheet is supported on a slope and further comprises a collection trough along the edge of said insulating layer where the thickness is a minimum.

References Cited by the Examiner

UNITED STATES PATENTS

| | | | |
|---|---|---|---|
| 1,816,592 | 7/1931 | Knapen | 62—260 |
| 2,202,019 | 5/1940 | Mohr | 62—389 X |
| 2,499,982 | 3/1950 | Suiter | 62—93 X |
| 2,838,768 | 6/1958 | Fischett | 150—2.1 X |
| 2,996,897 | 8/1961 | Grimes | 62—260 |
| 3,195,619 | 7/1965 | Tippmann | 62—260 X |
| 3,270,515 | 9/1966 | Telkes | 62—272 X |

OTHER REFERENCES

Awbery, J. H.: "Notes on Some Recent Developments in Hygrometry," Journal of Scientific Instruments, vol. 20, No. 10, October 1943, pages 153–154.

Taylor, Carlton F.: "A Device for Recording the Duration of Dew Deposits," Plant Disease Reporter, vol. 40, No. 12, Dec. 15, 1956, pages 1025–1028.

HARRY B. THORNTON, *Primary Examiner.*

D. TALBERT, *Assistant Examiner.*